(12) United States Patent
David et al.

(10) Patent No.: US 7,216,557 B2
(45) Date of Patent: May 15, 2007

(54) APPARATUS AND METHOD FOR TESTING AND OCCUPANT POSITION SENSING SYSTEM OF A VEHICLE

(75) Inventors: Raymond J. David, Dearborn Heights, MI (US); Jon K. Wallace, Redford, MI (US); Charles E. Steffens, Jr., Washington, MI (US)

(73) Assignees: TRW Vehicle Safety Systems Inc., Washington, MI (US); TRW Automotive U.S. LLC, Farmington Hills, MI (US)

( * ) Notice: Subject to any disclaimer, the term of this patent is extended or adjusted under 35 U.S.C. 154(b) by 120 days.

(21) Appl. No.: 10/930,957

(22) Filed: Sep. 1, 2004

(65) Prior Publication Data
US 2005/0056104 A1 Mar. 17, 2005

Related U.S. Application Data

(60) Provisional application No. 60/503,962, filed on Sep. 17, 2003.

(51) Int. Cl.
*G01P 13/00* (2006.01)
*G01P 21/00* (2006.01)
*B60R 21/16* (2006.01)

(52) U.S. Cl. .................. 73/865.9; 73/865.3; 73/866.4
(58) Field of Classification Search .............. 73/865.3, 73/865.9, 866.4; 280/734, 735
See application file for complete search history.

(56) References Cited

U.S. PATENT DOCUMENTS

| 5,456,019 | A | 10/1995 | Dowell et al. |
|---|---|---|---|
| 5,818,235 | A | 10/1998 | Simonov et al. |
| 5,983,147 | A * | 11/1999 | Krumm .................. 701/45 |
| 6,023,984 | A * | 2/2000 | Mazur et al. ............ 73/865.3 |
| 6,131,436 | A | 10/2000 | O'Bannon et al. |
| 6,386,054 | B1 | 5/2002 | Jones et al. |
| 6,522,998 | B1 * | 2/2003 | Mazur et al. ............... 703/8 |
| 6,523,417 | B1 | 2/2003 | Donahue et al. |
| 6,672,177 | B2 * | 1/2004 | Hutchenreuther et al. . 73/865.3 |
| 6,917,126 | B2 * | 7/2005 | Tsuboi et al. .............. 310/12 |
| 2002/0157450 | A1 | 10/2002 | Hutchenreuther et al. |
| 2005/0065757 | A1 * | 3/2005 | White ...................... 703/8 |
| 2006/0028005 | A1 * | 2/2006 | Dell' et al. ............... 280/735 |

FOREIGN PATENT DOCUMENTS

EP 1254812 A1 * 11/2002

* cited by examiner

Primary Examiner—Hezron Williams
Assistant Examiner—David A. Rogers
(74) Attorney, Agent, or Firm—Tarolli, Sundheim, Covell & Tummino LLP (57) ABSTRACT

A method and apparatus (40) for testing an occupant position sensing system (12) of a vehicle (10) includes a motor (42) having a stationary portion (44) and a movable portion (46). A test object (90) is fixed relative to the movable portion (46) of the motor (42). A motor position sensor (64) senses a position of the movable portion (46) of the motor (42) relative to the stationary portion (44) and for providing a motor position signal indicative thereof. Motor drive electronics (58) are responsive to the motor position signal for controlling the motor (42) for moving the test object (90). A data recorder (80) is adapted to receive and record data from the occupant position sensing system (12) and is adapted to receive and record the motor position signal provided by the motor position sensor (64).

25 Claims, 4 Drawing Sheets

APPARATUS AND METHOD FOR TESTING AND OCCUPANT POSITION SENSING SYSTEM OF A VEHICLE

RELATED APPLICATIONS

This application claims the benefit of U.S. Provisional Application No. 60/503,962, which was filed on Sep. 17, 2003.

TECHNICAL FIELD

The present invention relates to an apparatus and method for testing an occupant position sensing system of a vehicle. More particularly, the present invention relates to an apparatus and method for testing an occupant position sensing system that is used for controlling an actuatable occupant restraint system of a vehicle.

BACKGROUND OF THE INVENTION

It is known to control the actuation of an actuatable occupant restraint system, such as an air bag, in response to a sensed position of the occupant of the vehicle. The position of the occupant is determined using an occupant position sensing system. Such systems generally determine a position of the occupant relative to a fixed reference point, such as, for example, the deployment door of an air bag module. Occupant position sensors may include forward mounted sensors such as cameras or ultrasonic sensors.

The occupant position system provides sensed occupant position information to an air bag controller. The air bag controller is responsive to the sensed occupant position information for controlling the air bag. For example, the air bag controller may be responsive to the sensed occupant position information for inhibiting actuation of the air bag or for actuating the air bag in a low inflation mode, i.e., less than 100% maximum possible inflation pressure.

Testing of a dynamic occupant position sensing system has generally resulted in damage to all or part of the vehicle in which the occupant position sensing system is located. For example, one known testing procedure for testing an occupant position sensing system includes placing a crash dummy on the occupant seat and sharply braking the vehicle. Given such a testing procedure, the ability to repeat test under various conditions, such as under differing ambient light conditions, becomes economically impractical.

One known system for testing occupant position sensing systems uses pneumatics for launching a head-shaped form toward an instrument panel of a stationary vehicle. The pneumatic system, however, is likely to result in damage to the instrument panel of the vehicle. The pneumatic system also is unable to accurately mimic occupant movement for particular vehicle crash scenarios, such as a crash scenario involving pre-crash braking.

U.S. Pat. No. 6,672,177 discloses another system for testing an air bag proximity suppression system. The system includes rails for enabling motion of an occupant model along three orthogonal axes. The system disclosed in the 6,672,177 patent is large and appears to require removal of the vehicle seat at the location at which testing is to occur.

It is desirable to be able to test the occupant position sensing system without damaging the vehicle containing the occupant position sensing system. It is also desirable to enabling such testing to be repeatable under various environmental conditions, such as variable amounts of ambient light, and in some instances, to conduct the test without removing the vehicle seat or seat back.

SUMMARY OF THE INVENTION

The present invention relates to an apparatus for testing an occupant position sensing system of a vehicle. The apparatus comprises a motor having a stationary portion and a movable portion. A test object is fixed relative to the movable portion of the motor and is configured to be monitored by the occupant position sensing system. The apparatus also comprises a motor position sensor for sensing a position of the movable portion of the motor relative to the stationary portion and for providing a motor position signal indicative thereof. Motor drive electronics are responsive to the motor position signal for controlling the motor for moving the test object. The apparatus further comprises a data recorder that is adapted to receive and record data from the occupant position sensing system and that is adapted to receive and record the motor position signal provided by the motor position sensor. The motor position signal provides a reference position of the test object against which the data from the occupant position sensing system may be compared.

According to another aspect, the present invention relates to an apparatus for testing an occupant position sensing system that is adapted to monitor a position of an occupant of a seat of a vehicle. The apparatus comprises a test object that is configured to be monitored by the occupant position sensing system. The apparatus also includes a motor for moving the test object so that the test object may be monitored by the occupant position sensing system. The apparatus further comprises means for positioning the test object in front of a backrest portion of the seat of the vehicle at a location for which the position of the occupant is to be determined.

According to yet another aspect, the present invention relates to a method for testing an occupant position sensing system of a vehicle. The method comprises the steps of: fixing a test object that is configured to be monitored by the occupant position sensing system to a movable portion of a motor that includes a stationary portion and the movable portion; positioning the test object in the vehicle; controlling the motor to move the movable portion of the motor and the test object, which is fixed to the movable portion, within the vehicle and relative to the stationary portion of motor; sensing a position of the movable portion of the motor relative to the stationary portion; providing a motor position signal indicative of the sensed position; sensing a position of the test object with the occupant position sensing system of the vehicle; providing an occupant position signal indicative of the sensed occupant position; and recording the motor position signal and the occupant position signal. The motor position signal provides a reference position of the test object against which the data from the occupant position sensing system may be compared.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figures 1, 3:
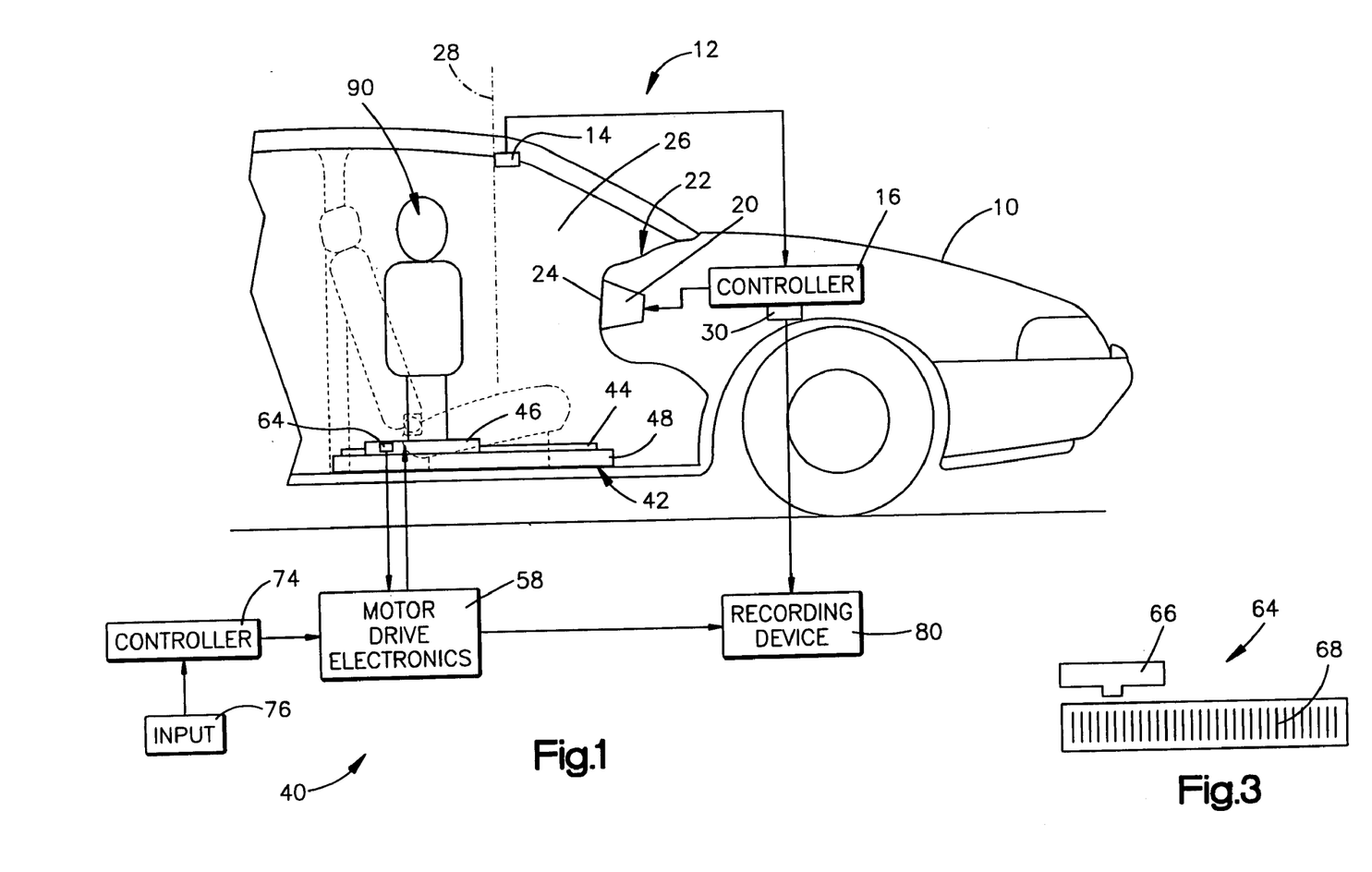
FIG. 1 schematically illustrates a vehicle that includes an occupant position sensing system and an apparatus constructed in accordance with an exemplary embodiment of the present invention for testing the occupant position sensing system of the vehicle.
FIG. 3 schematically illustrates an exemplary motor position sensor for a motor of the apparatus of FIG. 1.

Referring to FIG. 1, a vehicle 10 includes an occupant position sensing system 12. The occupant position sensing system 12 includes a sensor element 14 and a controller 16. The sensor element 14 is adapted for obtaining data indicative of the position of an occupant of the vehicle 10 relative to a fixed reference. The fixed reference may be part an inflatable restraint module. For example, FIG. 1 illustrates as an air bag module 20 mounted in the instrument panel 22 of the vehicle 10. The air bag module includes a deployment door 24. In the occupant position sensing system 12 of FIG. 1, a rearward most portion of the deployment door 24 is the fixed reference.

The sensor element 14 of the occupant position sensing system 12 may be any device for obtaining occupant position data and providing a signal indicative of the sensed data. For example, the sensor element 14 may include one or more cameras for obtaining images of the occupant in the interior of the vehicle 10. Other examples of the sensor element 14 include one or more of an infrared sensor, an ultrasonic sensor, or a microwave or laser sensor.

The controller 16 of the occupant position sensing system 12 is operatively connected to the sensor element 14 and receives the signal provided by the sensor element. The controller 16 is adapted for analyzing the occupant position data provided in the signal for determining the position of the occupant relative to the fixed reference. The controller 16 runs a known algorithm for analyzing the occupant position data for determining the position of the occupant. For example, when the sensor element 14 includes one or more cameras for obtaining images of the occupant within the interior of the vehicle 10, the controller 16 may run a known pattern recognition algorithm for determining the position of the occupant.

The controller 16 of the occupant position sensing system 12 is operatively connected to an air bag controller (not shown) for controlling actuation of the air bag module 20. Alternatively, a single controller, shown as controller 16 in FIG. 1, may control both the occupant position sensing system 12 and the air bag module 20. When controller 16 controls both the occupant position sensing system 12 and the air bag module 20, the controller 16 is responsive to the determined occupant position relative to the fixed reference for controlling actuation of the air bag module 20. For example, if the controller 16 determines that an occupant is within a zone 26 located proximate the deployment door 24, the controller 16 may inhibit, or otherwise limit, the actuation of the air bag module 20. Ways that the controller 16 may otherwise limit actuation of the air bag module 20 include venting or actuating a multi-stage inflator in a low power mode.

The dashed line 28 of FIG. 1 illustrates the leftward most boundary of the zone 26. In an exemplary vehicle, the leftward most boundary 28 is located approximately 200 millimeters from the deployment door 24 of the air bag module 20.

Figure 2:
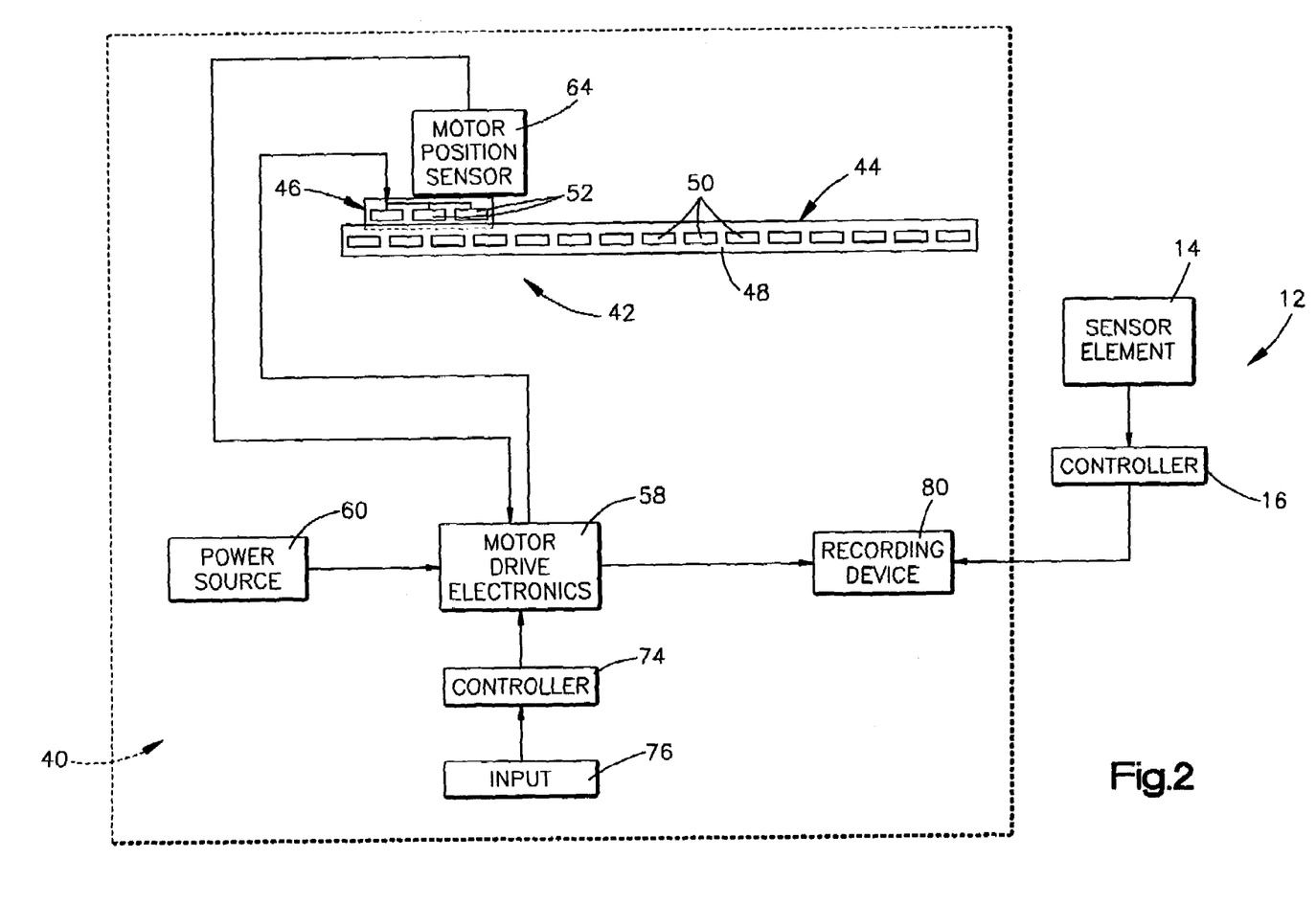
FIG. 2 is a schematic block diagram of the apparatus of FIG. 1 connected to the occupant position sensing system of the vehicle.

The controller 16 of the occupant position sensing system 12 also includes an output, indicated schematically at 30 in FIGS. 1 and 2. The controller 16 is adapted for providing, via the output 30, an occupant position signal that is indicative of the determined position of the occupant. The output 30 may be connected to a bus (not shown) of the vehicle 10. Alternatively, the output 30 may be an output dedicated for testing of the vehicle, such as, for example, a dedicated RS232 port.

FIG. 1 also schematically illustrates an apparatus 40 constructed in accordance with an exemplary embodiment of the present invention. FIG. 2 illustrates a schematic block diagram of the apparatus 40 of FIG. 1 connected to the occupant position sensing system 12 of the vehicle 10.

The apparatus 40 includes a linear motor 42. As best shown in FIG. 2, the linear motor includes a stationary portion 44 and a movable portion 46. The stationary portion 44 of the linear motor 42 includes a base 48 and plurality of permanent magnets 50. The movable portion 46 of the linear motor 42 includes a plurality of electromagnets 52. Alternatively, the movable portion 46 of the linear motor 42 may include the permanent magnets 50 and the stationary portion 44 may include the electromagnets 52. In a preferred embodiment of the linear motor 42, however, the electromagnets 52 are located in the movable portion 46. Preferably, a mass of the movable portion 46 of the linear motor 42 is kept to a minimum. Thus, the electromagnets 52, which generally weigh significantly less than the permanent magnets 50, preferably are incorporated in the movable portion 46.

The electromagnets 52 of the linear motor 42 are electrically coupled to motor drive electronics 58. The motor drive electronics 58 include known structures for receiving electrical power from a power source 60 and for providing electric power to the electromagnets 52. When the electromagnets 52 are incorporated in the movable portion 46 of the linear motor 42, as shown in FIG. 1, the electric power provided to the electromagnets 52 causes the movable portion 46 of the linear motor 42 to move relative to the stationary portion 44 of the linear motor. Preferably, the power source 60 provides three-phase alternating current to the motor drive electronics 58. The motor drive electronics 58, in turn, control energization of the electromagnets 52 to control movement of the movable portion 46 of the linear motor 42 relative to the stationary portion 44.

The apparatus 40 also includes a motor position sensor 64 that is associated with the linear motor 42. The motor position sensor 64 is a high resolution position sensor that is adapted to provide feedback signals to the motor drive electronics 58 indicative of the relative position between the stationary portion 44 and the movable portion 46 of the linear motor 42. In response to the feedback signals from the motor position sensor 64, the motor drive electronics 58 control commutation of the linear motor 42.

FIG. 3 illustrates an exemplary embodiment of the motor position sensor 64. The motor position sensor 64 of FIG. 3 is a high resolution optical encoder 66. The optical encoder 66 is fixedly mounted to the movable portion 46 of the linear motor 42. Markings 68, that may appear similar to bar codes, are located on a surface of the stationary portion 44 of the linear motor 42 in a location adjacent the optical encoder 66. The optical encoder 66 is adapted to read the markings 68 and to provide a motor position signal indicative of the position of the movable portion 46 of the linear motor 42 relative to the stationary portion 44.

The apparatus 40 also includes a controller 74. The controller 74 is operatively connected to the motor drive electronics 58 and controls the motor drive electronics. Thus, the controller 74 controls the linear motor 42. In an exemplary embodiment of the invention, the controller 74 is a personal computer. The controller 74 runs a program for controlling the motor drive electronics 58 to provide desired performance of the linear motor 42. For example, the controller 74 may control the motor drive electronics 58 for causing the movable portion 46 of the linear motor 42 to move to the right, as viewed in FIG. 1, at a desired rate. The rate may be a constant velocity, a constant acceleration, or a variable velocity/acceleration type movement. The controller 74 also controls the motor drive electronics 58 to stop the movable portion 46 of the linear motor 42 at a location adjacent to, but spaced apart from, the instrument panel 22 of the vehicle 10.

The controller 74 is provided with an input 76 through which data may be entered into the controller. The input 76 may be a keyboard, a drive unit, or any other type of input for inputting data into the controller 74.

A recording device 80 of the apparatus 40 is operatively connected to the motor drive electronics 58. The recording device 80 may be any type of data collection device. In an exemplary embodiment of the invention, the recording device 80 is a personal computer. The recording device 80 receives the motor position signal provided from the motor position sensor 64. As set forth above, the motor position signal from the motor position sensor 64 is provided to the motor drive electronics 58 as a commutation control feedback. In additional to using the data provided in the motor position signal for controlling commutation of the linear motor 42, the motor drive electronics 58 also outputs the motor position signal to the recording device 80. The recording device 80 records the data provided in the received motor position signals.

As an alternative to providing the recording device 80 with the motor position signal from the motor position sensor 64 via the motor drive electronics 58, he motor position sensor 64 may be directly connected to the recording device 80.

As shown in FIG. 2, during testing of the occupant position sensing system 12, the controller 16 of the occupant position sensing system 12 is operatively connected to the recording device 80. A cable may be used to connect the output 30 of the controller 16 to the recording device 80. The controller 16 provides a signal indicative of the determined occupant position to the recording device 80. The recording device 80 records the determined occupant position information provided by the controller 16.

As shown in FIG. 1, the apparatus 40 also includes a test dummy 90. FIG. 1 illustrates the test dummy 90 as including a head and torso only. The test dummy 90, however, may have configurations other than that illustrated in FIG. 1. The test dummy 90 is fixedly mounted to the movable portion 46 of the linear motor 42. As the movable portion 46 of the linear motor 42 moves relative to the stationary portion 44, the test dummy 90 moves with the movable portion 46.

The test dummy 90 meets the intent of Federal Motor Vehicle Safety Standard 208, but is much lighter in weight than a standard anthropomorphic test dummy. In an exemplary embodiment of the present invention, the test dummy 90 is formed from a light weight foam material that is covered with an outer skin that may be sensed with the sensor element 14 of the occupant position sensing system 12. For example, when the sensor element 14 is an ultrasonic sensor, the outer skin of the test dummy 90 may need to be adapted to reflect ultrasonic signals in a manner similar to human skin. The test dummy 90 also includes a lightweight mounting tube, such as an aluminum mounting tube. The outer skin of the test dummy 90 may be constructed of parts from anthropomorphic test dummy constructed in accordance with 49 C.F.R. Part 572 (particularly, sections 572.140 and 572.141), as published in the Federal Register, Mar. 22, 2000 and which is incorporated herein by reference in its entirety.

The use of a light weight test dummy 90 reduces the mass of the assembly of the movable portion 46 of the linear motor 42 and the test dummy 90. As a result of the reduced mass, the momentum of the assembly of the movable portion 46 and the test dummy 90 is reduced during testing and the ability to stop the assembly prior to the test dummy contacting the instrument panel 22 is increased. During testing of the occupant position sensing system 12, contact between the test dummy 90 and the instrument panel 22 will generally result in damage to the instrument panel. By increasing the ability to stop the assembly of the movable portion 46 and the test dummy 90 prior to the test dummy contacting the instrument panel, the likelihood of damaging the instrument panel 22 of the vehicle 10 during testing of the occupant position sensing system 12 is reduced.

To test the occupant position sensing system 12 of the vehicle 10, the linear motor 42, along with the test dummy 90 fixed to the movable portion 46, is mounted within the vehicle 10. In the exemplary embodiment of FIG. 1, the vehicle seat (not shown) at the location to be tested is removed and the linear motor 42 is positioned in the vehicle in the position previously occupied by the removed vehicle seat. For example, when testing the occupant position sensing system 12 for detecting an occupant of the passenger seat of the vehicle 10, the passenger seat is removed and the linear motor 42 is positioned in the vehicle at the location of the removed passenger seat.

For increasing the accuracy of the test, portions of the apparatus 40, other than the test dummy 90, which are located within the vehicle 10 may be coated with a paint or other type of coating having a low reflectivity so that the portions are not sensed by the occupant position sensing system 12.

When the linear motor 42 is positioned in the vehicle 10, the stationary portion 44 of the linear motor 42 is leveled and is secured relative to the vehicle 10 to prevent relative movement between the stationary portion and the vehicle. The apparatus 40 is then calibrated so as to be able to provide information regarding the relative position between the test dummy 90 and the fixed reference. To calibrate the apparatus 40, the movable portion 46 of the linear motor 42 is moved slowly to the right, as viewed in FIG. 1, relative to the stationary portion 44 until the test dummy 90 comes into contact with the instrument panel 22, which includes the deployment door 24 of the air bag module 20. When the test dummy 90 is in contact with the instrument panel 22, the motor position signal from the motor position sensor 64 is analyzed to determine the relative position between the movable portion 46 and the stationary portion 44 of the electric motor 42. The determined relative position is used as a baseline or reference position for the apparatus 40.

During testing of the occupant position sensing system 12 of the vehicle 10, the test dummy 90 is positioned in the desired initial position, to the left as shown in FIG. 1. To place the test dummy 90 in the desired initial position, the linear motor 42 is controlled to move the movable portion 46 to a location relative to the stationary portion 44 for placing the test dummy 90 at the desired initial position. For example, if the desired initial position of the test dummy is 500 millimeters away from the instrument panel 22, the movable portion 46 of the linear motor 42 is moved to a position 500 millimeters away from the determined baseline position.

After the test dummy 90 is positioned in the desired initial position, the linear motor 42 is controlled to move the test dummy 90 relative to the instrument panel 22 in accordance with the event to be simulated, such as a vehicle braking. The controller 74 via the motor drive electronics 58 controls the linear motor 42 to provide various accelerations and velocities of the test dummy 90 so as to simulate occupant movement during various types and severities of crash events. For example, the linear motor 42 may be controlled to move the test dummy 90 to simulate pre-crash braking.

The linear motor 42 also is controlled to stop the movement of the test dummy 90 prior to the test dummy contacting the instrument panel 22. Thus, the apparatus 40 enables testing of the occupant position sensing system 12 of the vehicle 10 without damaging any portion of the vehicle 10. As a result, the apparatus 40 enables the testing of the occupant position sensing system 12 to be repeated under various conditions.

During the movement of the test dummy 90 relative to the instrument panel 22, the motor position sensor 64 provides signals to the recording device 80 indicative of the relative position between the test dummy 90 and the baseline position. The controller 16 of the occupant position sensing system 12 also provides signals to the recording device 80 indicative of the determined occupant position. The recording device 80 records the data received from both the motor position sensor 64 and the occupant position sensing system 12.

The recording device 80 enables the determined occupant positions from the occupant position sensing system 12 at particular points in time to be compared to the positions indicated by the motor position signals from the motor position sensor 64 at the same points in time. As a result, the ability of the occupant position sensing system 12 to detect the occupant entering the zone 26 can be determined. The recording device 80 also enables the results of the test to be plotted. For example, plots of position versus time as well as velocity versus time and acceleration versus time may be generated from the recorded position data.

Figure 4:
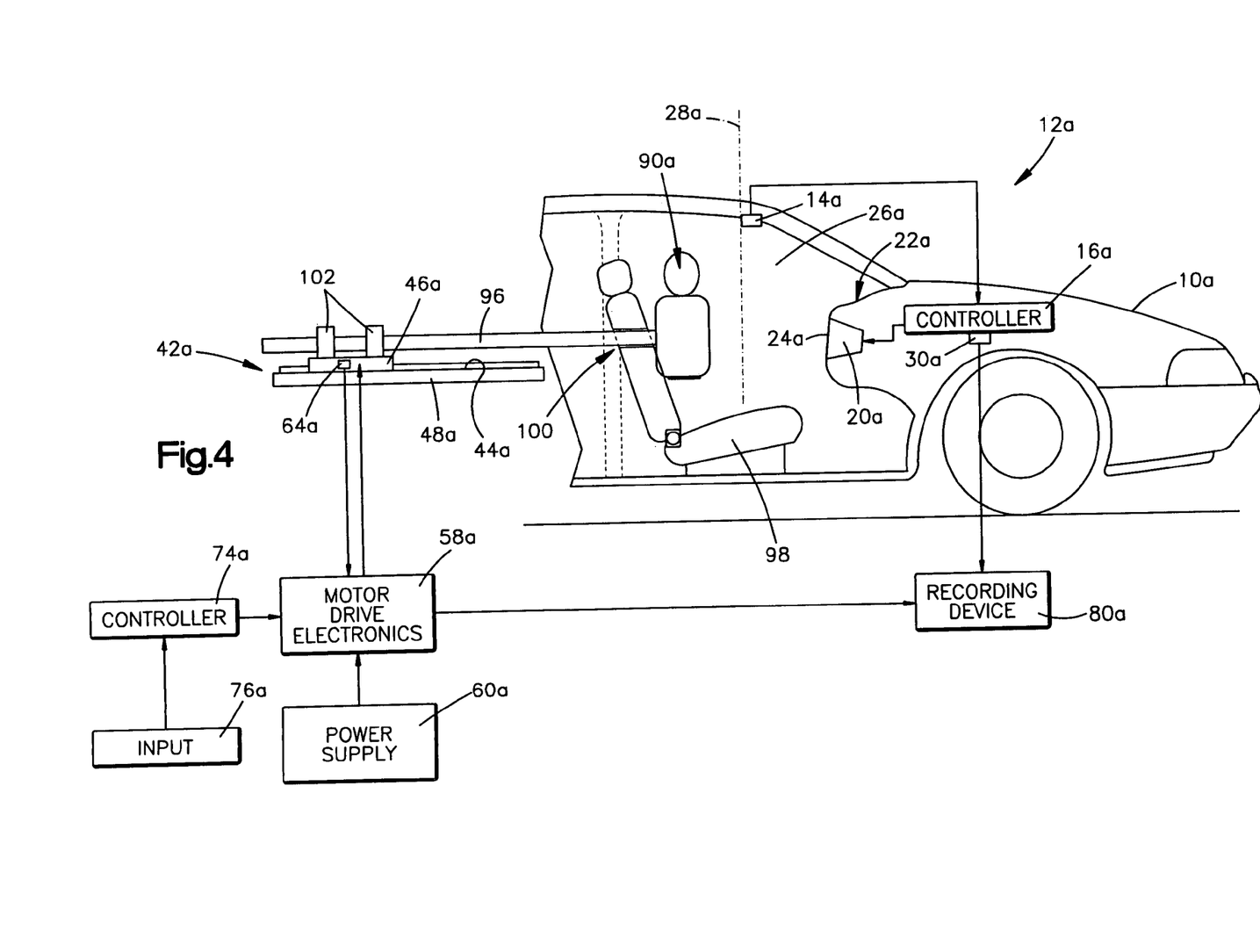
FIG. 4 schematically illustrates a vehicle that includes an occupant position sensing system and an apparatus constructed in accordance with a second exemplary embodiment of the present invention for testing the occupant position sensing system of the vehicle.

FIG. 4 schematically illustrates an apparatus 40a constructed in accordance with a second exemplary embodiment of the present invention. The apparatus 40a of FIG. 4 is mounted in a vehicle 10a for testing the occupant position sensing system 12a of the vehicle. Structures of FIG. 4 that are the same as or similar to those described with reference to the apparatus 40 of FIG. 1 are numbered with the same reference numbers as used in FIGS. 1–3 with the addition of the suffix "a". Also, for brevity of the present invention, those structures of the apparatus 40a of FIG. 4 that have already been described in detail with reference to FIGS. 1–3 will not be described again with reference to FIG. 4.

The apparatus 40a of FIG. 4 is identical to the apparatus 40 of FIG. 1 with the exception that the test dummy 90a is not mounted directly to the movable portion 46a of the linear motor 42a. Instead, in the exemplary embodiment of FIG. 4, the test dummy 90a is mounted on an end of a long rod 96 that is fixed to the movable member 46a of the linear motor 42a.

The apparatus 40a of FIG. 4 enables the vehicle seat 98 associated with the position of the vehicle 10a to be tested to remain in place in the vehicle during the testing of the occupant position sensing system 12a. As a result, a more realistic test of the occupant position sensing system 12a is performed since background structure of the vehicle 10a is not removed during the test, particularly, since some occupant position sensing systems may use the background structure as part of the evaluation criteria.

The apparatus 40a of FIG. 4 operates in the same manner as the apparatus 40 of FIG. 1 for testing the occupant position sensing system 12a of the vehicle 10a. To position the test dummy 90a in front of the seat 98 at the location of the vehicle 10a to be tested, a hole 100 is formed in the backrest portion of the seat 98 associated with that vehicle location and the rod 96, to which the test dummy 90a is attached, is extended through the hole. An end of the rod 96 opposite the test dummy 90a is secured to the movable portion 46a of the linear motor 42a. FIG. 4 illustrates two clamps 102 for securing the end of the rod 96 to the movable portion 46a of the linear motor 42a.

Figure 5:
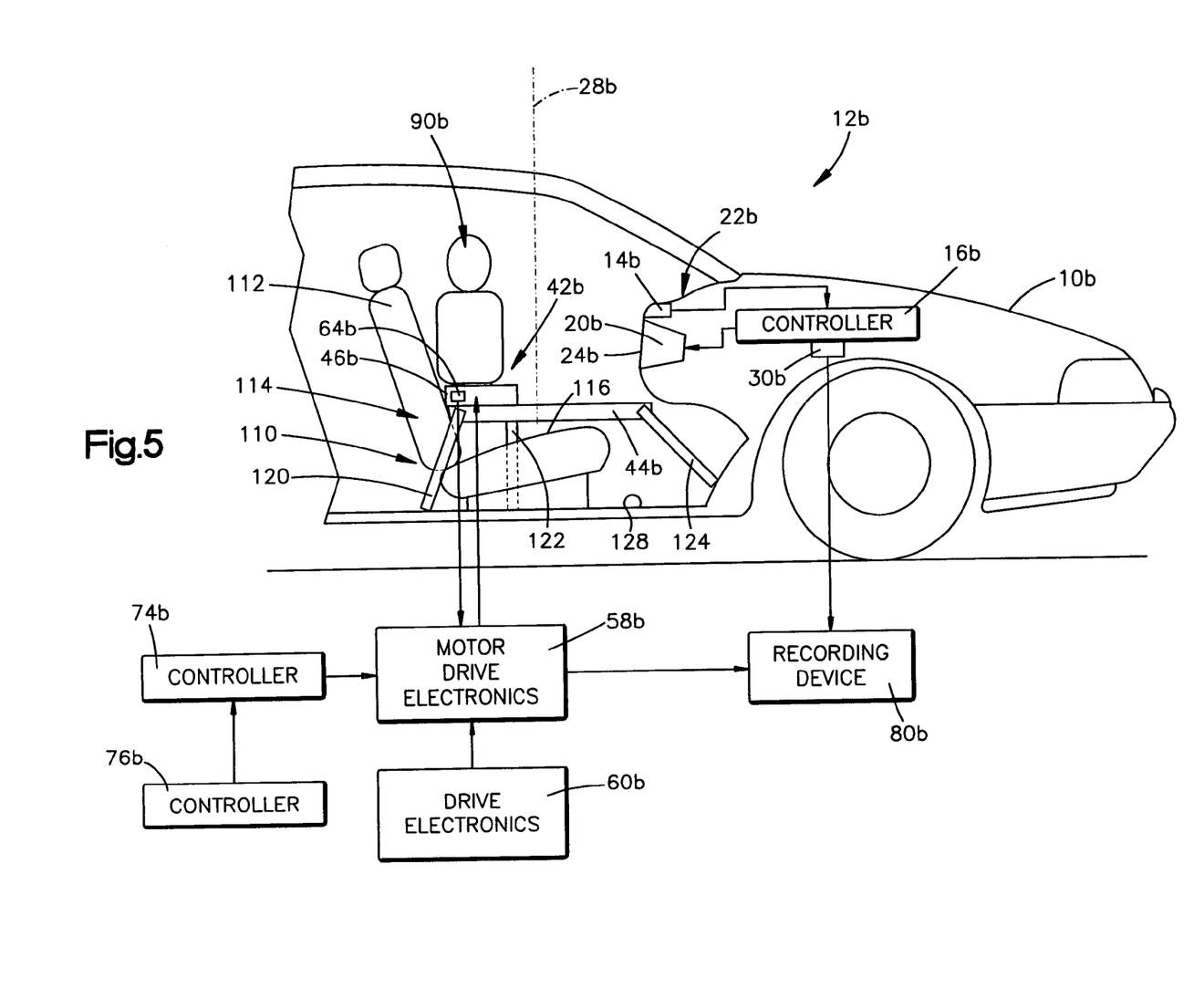
FIG. 5 schematically illustrates a vehicle that includes an occupant position sensing system and an apparatus constructed in accordance with a third exemplary embodiment of the present invention for testing the occupant position sensing system of the vehicle.

FIG. 5 schematically illustrates an apparatus 40b constructed in accordance with a third exemplary embodiment of the present invention. The apparatus 40b of FIG. 5 is mounted in a vehicle 10b for testing the occupant position sensing system 12b of the vehicle. Structures of FIG. 5 that are the same as or similar to those described with reference to the apparatus 40 of FIG. 1 are numbered with the same reference numbers as used in FIGS. 1–3 with the addition of the suffix "b". Also, for brevity of the present invention, those structures of the apparatus 40b of FIG. 5 that have already been described in detail with reference to FIGS. 1–3 will not be described again with reference to FIG. 5.

In FIG. 5, the sensor element 14b of the occupant position sensing system 12b is mounted in the instrument panel 22b in a location above the air bag module 20b. As with the embodiments of FIGS. 1 and 4, the sensor element 14b may be located at any location in the vehicle for sensing the position of an occupant, such as the overhead area.

The apparatus 40b of FIG. 5 is identical to the apparatus 40 of FIG. 1 with the exception that the apparatus 40b includes a support structure 110 that enables the linear motor 42b to be positioned in front of a backrest portion 112 of a seat 114 of the vehicle 10b. The support structure 110 of FIG. 5 includes legs 120, 122, and 124 that enable the linear motor 42b to be positioned on or above a cushion portion 116 of the seat 114.

The legs 120, 122, and 124 extend between the stationary portion 44b of the linear motor 42b and structure of the vehicle 10b, such as the floor 128 of the vehicle. Preferably, two of the legs, shown in FIG. 5 as legs 120 and 124, are located at opposite ends of the stationary portion 44b of the linear motor 42b. The legs 120, 122, and 124 may be adapted to telescope so that the length of each leg may be adjusted. One vehicle arrangement might include two legs at the front of the stationary portion 44b of the linear motor 42b and the rear of the stationary portion being supported by the cushion portion 116 of the seat 112. Spacer blocks may be used for leveling the stationary portion 44b of the linear motor 42b. The legs 120, 122, and 124 also may include structure for securing the legs to the vehicle 10b, such as feet that may be fixed to the floor 128 of the vehicle.

The apparatus 40b of FIG. 5 operates in the same manner as the apparatus 40 of FIG. 1 for testing the occupant position sensing system 12b of the vehicle 10b. Like the apparatus 40a of FIG. 4, the apparatus 40b of FIG. 5 enables the vehicle seat 114 associated with the position of the vehicle 10b to be tested to remain in place in the vehicle during the testing of the occupant position sensing system 12b. As a result, a more realistic test of the occupant position sensing system 12b is performed since background structure of the vehicle 10b is not removed during the test.

By enabling testing of occupant position sensing systems without damaging the vehicle in which the occupant position sensing system is located, the apparatus of the present invention makes it economically feasible to perform test under various environmental conditions. For example, the occupant position sensing system may be tested under varying amounts of ambient light, with the test dummies donned with various types of clothing, etc.

From the above description of the invention, those skilled in the art will perceive improvements, changes and modifications. For example, the motor position sensor may be a LVDT (linear voltage differential transformer). Such improvements, changes and modifications within the skill of the art are intended to be covered by the appended claims.

For purposes of full disclosure, sections 572.140 and 572.141 of 49 C.F.R. Part 572, as published in the Federal Register, Mar. 22, 2000 are reproduced below:

Subpart P-3-Year-Old Child Crash, Test Dummy, Alpha Version

§ 572.140 Incorporation by Reference.
 (a) The following materials are hereby incorporated in this subpart P by reference:
  (1) A drawings and specifications package entitled "Parts List and Drawings, Subpart P Hybrid III 3-year-old child crash test,dummy, (H-1113C, Alpha version) February 2000", incorporated by reference in § 572.141 and consisting of:
   (i) Drawing No. 210-1000, Head Assembly, incorporated by reference in §§ 572.141, 572.142, 572.144, 572.145, and 572.146;
   (ii) Drawing No. 210-2001, Neck Assembly, incorporated by reference in §§ 572.141, 572.143, 572.144, 572.145, and 572.146;
   (iii) Drawing No. TE-208-000, Headform, incorporated by reference in §§ 572.141, and 572.143;
   (iv) Drawing No. 210-3000, Upper/Lower Torso Assembly, incorporated by reference in §§ 572.141, 572.144, 72.145, and 572.146;
   (v) Drawing No. 210-5000-1(L), -2(R), Leg Assembly, incorporated by reference in §§ 572.141, 572.144, 572.145 as part of a complete dummy assembly;
   (vi) Drawing No. 210-6000-1(L), -2(R), Arm Assembly, incorporated by reference in §§ 572.141, 572.144, and 572.145 as part of the complete dummy assembly;
  (2) A procedures manual entitled "Procedures for Assembly, Disassembly and Inspection (PADI), Subpart P, Hybrid III 3-year-old Child Crash Test Dummy, (H-1113C, Alpha Version) February 2000", incorporated by reference in § 572.141;
  (3) SAE Recommended Practice J211/1, Rev. Mar 95 "Instrumentation for Impact Tests-Part 1-Electronic Instrumentation", incorporated by reference in § 572.146;
  (4) SAE J1733 1994-12 "Sign Convention for Vehicle Crash Testing" incorporated by reference in § 572.146.
  (5) The Director of the Federal Register approved those materials incorporated by reference in accordance with 5 U.S.C. 552(a) and 1 CFR Part 51.
  Copies of the materials may be inspected at NHTSA's Docket Section, 400 Seventh Street SW, room 5109, Washington, D.C., or at the Office of the Federal Register, 800 North Capitol Street, NW, Suite 700, Washington, D.C.
 (b) The incorporated materials are available as follows:
  (1) The drawings and specifications package referred to in paragraph (a) (1) of this section and the PAD1 document referred to in paragraph (a) (2) of this section are available from Reprographic Technologies, 9000 Virginia Manor Road, Beltsville, Md. 20705 (301) 419-5070.
  (2) The SAE materials referred to in paragraphs (a) (3) and (a) (4) of this section are available from the Society of Automotive Engineers, Inc., 400 Commonwealth Drive, Warrendale, Pa. 15096.

§ 572.141 General Description
 (a) The Hybrid III 3-year-old child dummy is described by the following materials:
  (1) Technical drawings and specifications package 210-0000 (refer to § 572.140(a) (1)), the titles of which are listed in Table A of this section;
  (2) Procedures for Assembly, Disassembly and Inspection document (PADI) (refer to § 572.140 (a) (2)).
 (b) The dummy is made up of the component assemblies set out in the following Table A of this section:

TABLE A

| Component assembly | Drawing No. |
| --- | --- |
| Head Assembly | 21O-1000 |
| Neck Assembly (complete) | 210-2001 |
| Upper/Lower Torso Assembly | 21 O-3000 |
| Leg Assembly | 210-5000-1 (L), -2(R) |
| Arm Assembly | 210-6000-1 (L), -203) |

(c) Adjacent segments are joined in a manner such that except for contacts existing under static conditions, there is no contact between metallic elements throughout the range of motion or under simulated crash impact conditions.
 (d) The structural properties of the dummy are such that the dummy conforms to this part in every respect only before use in any test similar to those specified in Standard 208, *Occupant Crash Protection*, and Standard 213, *Child Restraint Systems*.

We claim:

1. An apparatus for testing an occupant position sensing system of a vehicle, the apparatus comprising:
 a motor having a stationary portion and a movable portion;
 a test object fixed relative to the movable portion of the motor and configured to be monitored by the occupant position sensing system, wherein the test object is made of a light-weight foam material and includes an outer covering that is configured to be sensed by the occupant position sensing system;
 a motor position sensor for sensing a position of the movable portion of the motor relative to the stationary portion and for providing a motor position signal indicative thereof;

motor drive electronics that are responsive to the motor position signal for controlling the motor for moving the test object;

a data recorder adapted to receive and record data from the occupant position sensing system and adapted to receive and record the motor position signal provided by the motor position sensor, the motor position signal providing a reference position of the test object against which the data from the occupant position sensing system may be compared; and means for positioning the test object in the vehicle and in front of a backrest portion of a seat associated with a location of the vehicle to be tested by the occupant position sensing system, wherein the means for positioning the test object includes a rod having first and second ends, the test object being fixed to the first end of the rod and the second end of the rod being fixed to the movable portion of the motor.

2. The apparatus of claim 1 wherein the outer covering includes skin pieces adapted for use in an anthropomorphic test dummy constructed in accordance with 49 C.F.R. Part 572.

3. The apparatus of claim 1 wherein the motor is a linear motor that includes a plurality of electromagnets and a plurality of permanent magnets, one of the stationary portion and the movable portion of the motor including the plurality of electromagnets and another of the stationary portion and the movable portion including the plurality of permanent magnets.

4. The apparatus of claim 1 wherein the motor is adapted to be positioned in the vehicle behind the backrest portion of the seat, the rod extending through the backrest portion of the seat to position the test object in front of the backrest portion of the seat.

5. The apparatus of claim 1 wherein the motor position sensor includes an optical sensor that provides the motor position signal.

6. The apparatus of claim 5 wherein the optical sensor is fixed to the movable portion of the motor, the stationary portion of the motor including markings that are read by the optical sensor.

7. The apparatus of claim 1 wherein the means for positioning the test object includes a support structure that enables the motor to be positioned in the vehicle in front of the backrest portion of the seat.

8. The apparatus of claim 7 wherein the support structure includes legs, the legs supporting a portion of the motor above a cushion portion of the seat.

9. An apparatus for testing an occupant position sensing system that is adapted to monitor a position of an occupant of a seat of a vehicle, the apparatus comprising:

a test object configured to be monitored by the occupant position sensing system;

a motor for moving the test object so that the test object may be monitored by the occupant position sensing system; and means for positioning the test object in front of a backrest portion of the seat of the vehicle at a location for which the position of the occupant is to be determined, the means for positioning the test object including a rod having first and second ends, the test object being fixed to the first end of the rod and the second end of the rod being fixed to the movable portion of the motor.

10. The apparatus of claim 9 wherein the motor is adapted to be positioned in the vehicle behind the backrest portion of the seat, the rod extending through the backrest portion of the seat to position the test object in front of the backrest portion of the seat.

11. The apparatus of claim 9 wherein the means for positioning the test object further includes a support structure that enables the motor to be positioned in the vehicle in front of the backrest portion of the seat.

12. The apparatus of claim 11 wherein the support structure includes legs, the legs supporting a portion of the motor above a cushion portion of the seat.

13. The apparatus of claim 9 wherein the motor is adapted to move the test object in a prescribed manner toward an instrument panel of the vehicle and to stop movement of the test object prior to the test object contacting the instrument panel.

14. The apparatus of claim 13 wherein the test object is formed from a light weight material and includes a covering that is configured to be monitored by the occupant position sensing system.

15. The apparatus of claim 14 wherein the covering includes skin pieces adapted for use in an anthropomorphic test dummy constructed in accordance with 49 C.F.R. Part 572.

16. The apparatus of claim 13 further including a motor position sensor for monitoring a position of the motor and providing a motor position signal indicative thereof, motor drive electronics being responsive to the motor position signal for controlling the motor.

17. The apparatus of claim 16 further including a data recorder adapted to receive and record data from the occupant position sensing system and adapted to receive and record the motor position signal provided by the motor position sensor, the motor position signal providing a reference position of the test object against which the data from the occupant position sensing system may be compared.

18. The apparatus of claim 17 wherein the motor position sensor includes an optical sensor that provides the motor position signal.

19. An apparatus for testing an occupant position sensing system that is adapted to monitor a position of an occupant of a seat of a vehicle, the apparatus comprising:

a test object configured to be monitored by the occupant position sensing system, the test object positioned in the vehicle and in front of a backrest portion of the seat; and a motor for moving the test object so that the test object may be monitored by the occupant position sensing system, the motor being adapted to be positioned in the vehicle behind the backrest portion of the seat, the test object being fixed to a movable portion of the motor by a rod extending through the backrest portion of the seat to position the test object in front of the backrest portion of the seat.

20. The apparatus of claim 19 wherein the rod has first and second ends, the test object being fixed to the first end of the rod and the second end of the rod being fixed to the movable portion of the motor.

21. The apparatus of claim 19 wherein the motor is adapted to move the test object in a prescribed manner toward an instrument panel of the vehicle and to stop movement of the test object prior to the test object contacting the instrument panel.

22. The apparatus of claim 21 wherein the test object is formed from a light weight material and includes a covering that is configured to be monitored by the occupant position sensing system.

23. The apparatus of claim 22 wherein the covering includes skin pieces adapted for use in an anthropomorphic test dummy constructed in accordance with 49 C.F.R. Part 572.

24. The apparatus of claim 21 further including a motor position sensor for monitoring a position of the motor and providing a motor position signal indicative thereof, motor drive electronics being responsive to the motor position signal for controlling the motor.

25. The apparatus of claim 24 further including a data recorder adapted to receive and record data from the occupant position sensing system and adapted to receive and record the motor position signal provided by the motor position sensor, the motor position signal providing a reference position of the test object against which the data from the occupant position sensing system may be compared.

* * * * *